US011894607B2

(12) United States Patent
Lai et al.

(10) Patent No.: US 11,894,607 B2
(45) Date of Patent: Feb. 6, 2024

(54) INTEGRATED ANTENNA STRUCTURE

(71) Applicant: PEGATRON CORPORATION, Taipei (TW)

(72) Inventors: Po-Yen Lai, Taipei (TW); Ping-Hung Lu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 75 days.

(21) Appl. No.: 17/666,606

(22) Filed: Feb. 8, 2022

(65) Prior Publication Data

US 2022/0336947 A1 Oct. 20, 2022

(30) Foreign Application Priority Data

Apr. 14, 2021 (TW) ................................ 110204069

(51) Int. Cl.
*H01Q 1/44* (2006.01)
*H01Q 1/38* (2006.01)

(52) U.S. Cl.
CPC ................ *H01Q 1/44* (2013.01); *H01Q 1/38* (2013.01)

(58) Field of Classification Search
CPC .. H01Q 1/44; H01Q 1/38; H01Q 9/42; H01Q 21/28; H01Q 1/273
See application file for complete search history.

(56) References Cited

U.S. PATENT DOCUMENTS

2020/0243952 A1* 7/2020 Zhu ........................ G04R 60/02
2022/0336947 A1* 10/2022 Lai ........................... H01Q 1/38

FOREIGN PATENT DOCUMENTS

CN 210897603 U 6/2020
CN 212230604 U 12/2020

* cited by examiner

*Primary Examiner* — David E Lotter
(74) *Attorney, Agent, or Firm* — McClure, Qualey & Rodack, LLP

(57) ABSTRACT

An integrated antenna structure includes a frame, a circuit board, at least one antenna radiator, a support plate, a battery, and at least one metal sheet. The frame surrounds and defines an accommodation space. The circuit board is disposed in the accommodation space. The antenna radiator includes a body and a plurality of platforms. The body is disposed on the frame by using nano molding technology (NMT) and at least partially surrounds the accommodation space. The platforms are connected to the body and protrude toward the accommodation space. The platforms are configured to electrically connect to the circuit board respectively. The support plate is disposed in the accommodation space. The metal sheet is at least partially disposed on a surface of the support plate and extends along an edge of the support plate. One end of the metal sheet is electrically connected to the circuit board.

11 Claims, 5 Drawing Sheets

INTEGRATED ANTENNA STRUCTURE

RELATED APPLICATIONS

This application claims priority to Taiwanese Application Serial Number 110204069 filed Apr. 14, 2021, which is herein incorporated by reference.

BACKGROUND

Technical Field

The present disclosure relates to an integrated antenna structure.

Description of Related Art

With the improvement of the quality of people's lives, electronic products have become an indispensable part of people's lives, and the demand of people for electronic products is also increasing. In this regard, the industry continues to devote to enhancing and improving the efficiency of electronic products. For example, with the diversification of functions of electronic products, types of signal reception have also increased. Therefore, an antenna structure in an electronic product has become a research and development focus in the industry.

However, since people also require the electronic product to have a lightweight and slim profile, how to miniaturize the electronic product while enhancing the efficiency of the antenna structure is undoubtedly an important development direction in the industry.

SUMMARY

One of the objectives of the present disclosure is to provide an integrated antenna structure, which can achieve miniaturization while enhancing the efficiency of the signal receiving function.

According to an implementation of the present disclosure, an integrated antenna structure includes a frame, a circuit board, at least one first antenna radiator, a support plate, a battery, and at least one metal sheet. The frame surrounds and defines an accommodation space, and the circuit board is disposed in the accommodation space. The first antenna radiator includes a first body and a plurality of first platforms. The first body is disposed on the frame by using a nano molding technology (NMT) and at least partially surrounds the accommodation space. The first platforms are connected to the first body and protrude toward the accommodation space. The first platforms are configured to be electrically connected to the circuit board respectively. The support plate is disposed in the accommodation space. The metal sheet is at least partially disposed on a surface of the support plate and extends along an edge of the support plate. One end of the metal sheet is electrically connected to the circuit board.

In one or more implementations of the present disclosure, the metal sheet is disposed on the surface of the support plate by using laser direct structuring (LDS).

In one or more implementations of the present disclosure, the frame includes an annular portion and a plurality of separation portions. The annular portion has a first side and a second side opposite to each other. The separation portions are disposed on the first side. The first body is disposed on the first side and is connected between two adjacent separation portions.

In one or more implementations of the present disclosure, the integrated antenna structure further includes at least one second antenna radiator. The second antenna radiator includes a second body and a plurality of second platforms. The second body is disposed on the first side by using the NMT and is connected between two adjacent separation portions. The second body at least partially surrounds the accommodation space and is opposite to the first body. The second platforms are connected to the second body and protrude toward the accommodation space. The second platforms are configured to be electrically connected to the circuit board respectively.

In one or more implementations of the present disclosure, the circuit board includes a mainboard and a plurality of first elastic pieces. The mainboard has a first surface and a second surface opposite to each other. The first elastic pieces are disposed on the first surface. The first platforms, the second platforms, and the metal sheet are electrically connected to the corresponding first elastic pieces respectively.

In one or more implementations of the present disclosure, the circuit board includes a plurality of second elastic pieces, and the second elastic pieces are disposed on the second surface. The integrated antenna structure further includes at least one third antenna radiator. The third antenna radiator includes a third body and a plurality of third platforms. The third body is disposed on the second side by using the NMT and surrounds the accommodation space. The third platforms are connected to the third body and protrude toward the accommodation space. The third platforms are configured to be electrically connected to the corresponding second elastic pieces respectively.

In one or more implementations of the present disclosure, the third body is ring-shaped.

In one or more implementations of the present disclosure, the integrated antenna structure further includes a housing. The housing abuts against one side of the third body away from the frame, to seal the accommodation space.

In one or more implementations of the present disclosure, the integrated antenna structure further includes a display screen. The display screen abuts against the separation portions, and sides of the first antenna radiator and the second antenna radiator respectively away from the annular portion, to seal the accommodation space.

In one or more implementations of the present disclosure, a center of the annular portion and the separation portions are arranged in line.

In one or more implementations of the present disclosure, the integrated antenna structure further includes a plurality of the metal sheets.

In one or more implementations of the present disclosure, the integrated antenna structure further includes a battery, the support plate has a through hole, and the battery is at least partially disposed in the through hole.

The foregoing implementations of the present disclosure have at least the following advantages: The integrated antenna structure includes an antenna disposed on the support plate by using the LDS and a plurality of antennas connected to the frame by using the NMT, and the support plate is disposed in the accommodation space of the frame. Therefore, the integrated antenna structure can include a plurality of different antennas in a limited volume, so that the integrated antenna structure can achieve miniaturization while enhancing the signal receiving function.

DETAILED DESCRIPTION

Figure 1:
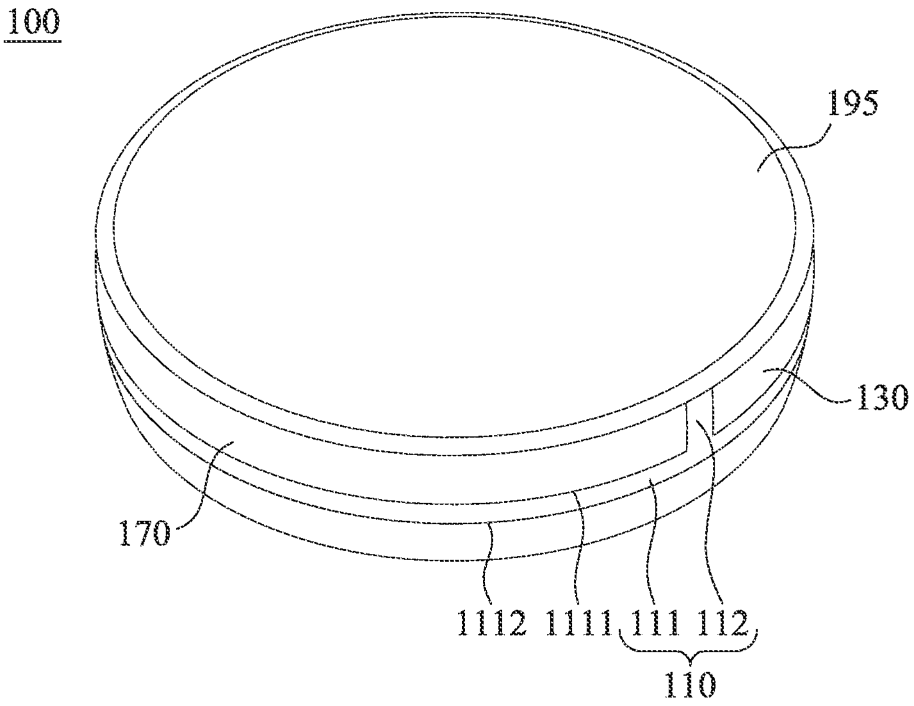
FIG. 1 is a schematic three-dimensional view of an integrated antenna structure according to an implementation of the present disclosure.

A plurality of implementations of the present disclosure is disclosed in the following drawings. For clear description, many practical details are described in the following descriptions. However, it should be understood that the practical details should not be intended to limit the present disclosure. That is, in some implementations of the present disclosure, the practical details are not mandatory. In addition, to simplify the drawings, some conventional structures and elements are shown in a simple schematic manner in the drawings, and the same reference numerals are used to indicate the same or similar elements in all of the drawings. In addition, if possible in implementation, features of different embodiments can be applied interactively.

Unless otherwise defined, all words (including technical and scientific terms) used in the present specification have respective usual meanings, and the meanings can be understood by those familiar with the field. Further, the definitions of the foregoing words in commonly used dictionaries should be interpreted in the content of the present specification as meanings consistent with those in the field related to the present disclosure. Unless specifically defined, the words are not interpreted as idealized or overly formal meanings.

Figure 2:
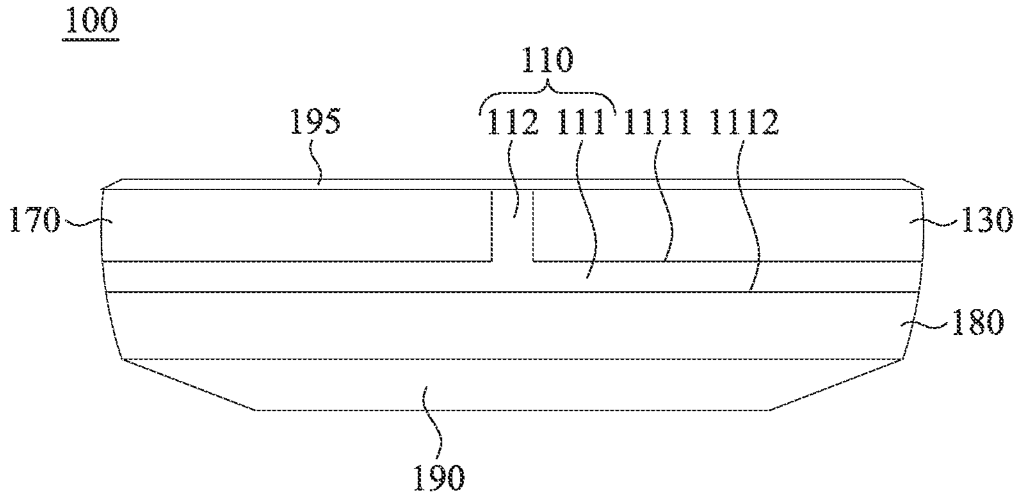
FIG. 2 is a side view of the integrated antenna structure of FIG. 1.
Figure 3:
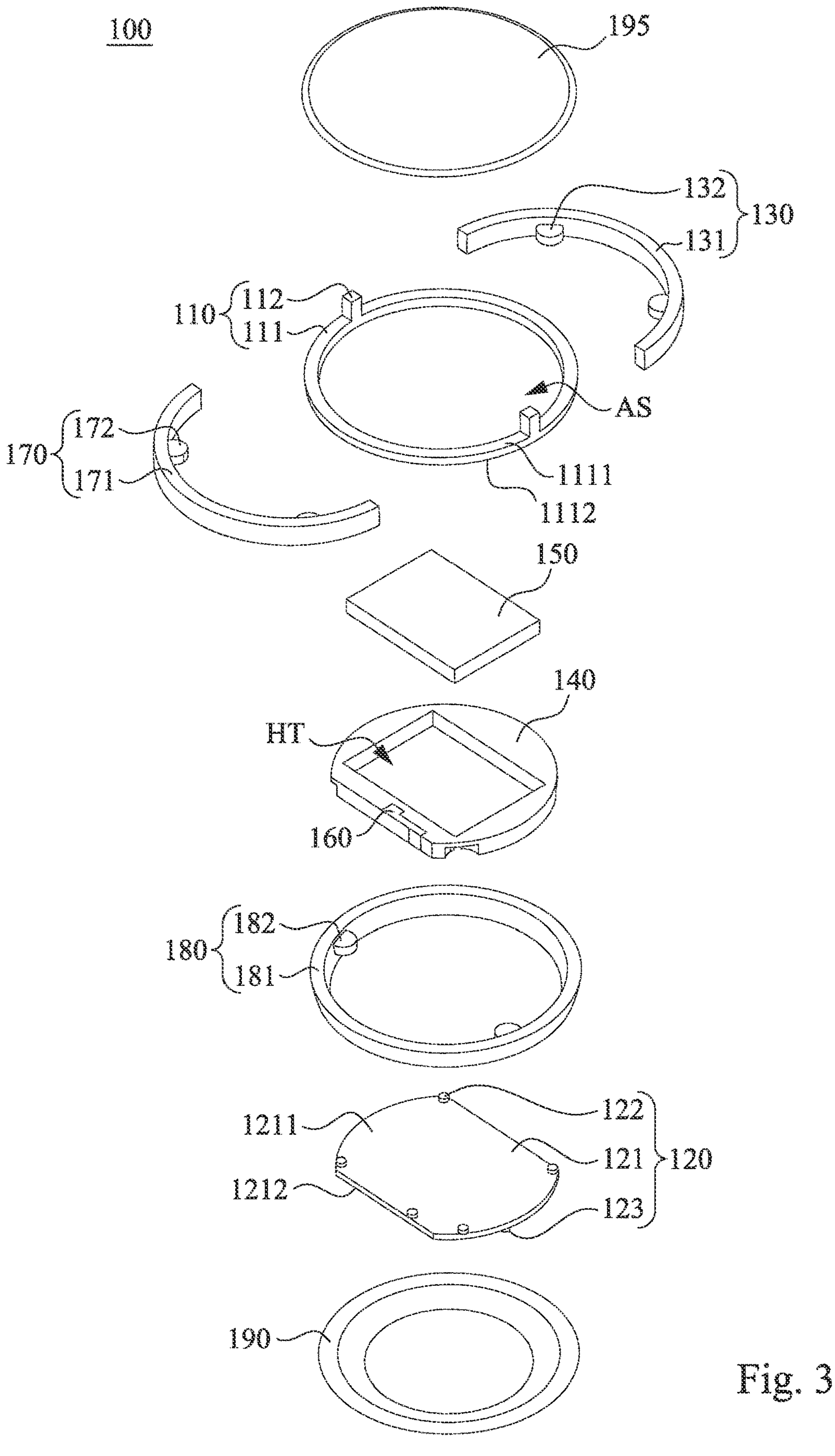
FIG. 3 is an exploded view of the integrated antenna structure of FIG. 1.

Refer to FIG. 1 to FIG. 3. FIG. 1 is a schematic three-dimensional view of an integrated antenna structure 100 according to an implementation of the present disclosure. FIG. 2 is a side view of the integrated antenna structure 100 of FIG. 1. FIG. 3 is an exploded view of the integrated antenna structure 100 of FIG. 1. In this implementation, as shown in FIG. 1 to FIG. 3, the integrated antenna structure 100 includes a frame 110, a circuit board 120, at least one first antenna radiator 130, a support plate 140, and a battery 150. The frame 110 surrounds and defines an accommodation space AS, and the circuit board 120 is disposed in the accommodation space AS. The first antenna radiator 130 includes a first body 131 and a plurality of first platforms 132. The first body 131 of the first antenna radiator 130 is disposed on the frame 110 and at least partially surrounds the accommodation space AS. The first platforms 132 of the first antenna radiator 130 are connected to the first body 131 and protrude toward the accommodation space AS.

Further, as shown in FIG. 1 to FIG. 3, the frame 110 includes an annular portion 111 and a plurality of separation portions 112. The annular portion 111 of the frame 110 has a first side 1111 and a second side 1112 opposite to each other. The separation portions 112 are disposed on the first side 1111 of the annular portion 111. The first body 131 of the first antenna radiator 130 is disposed on the first side 1111 of the annular portion 111 and is connected between two adjacent separation portions 112. In practical applications, a material of the frame 110 is plastic, a material of the first antenna radiator 130 is metal, and the first antenna radiator 130 is integrated to the frame 110 by using a nano molding technology (NMT). That is, the first body 131 of the first antenna radiator 130 is connected between the separation portions 112 and is disposed on the first side 1111 of the annular portion 111.

In addition, as shown in FIG. 1 to FIG. 3, the integrated antenna structure 100 further includes a display screen 195. The display screen 195 abuts against the separation portions 112 and one side of the first antenna radiator 130 away from the annular portion 111, to seal the accommodation space AS.

Figure 4:
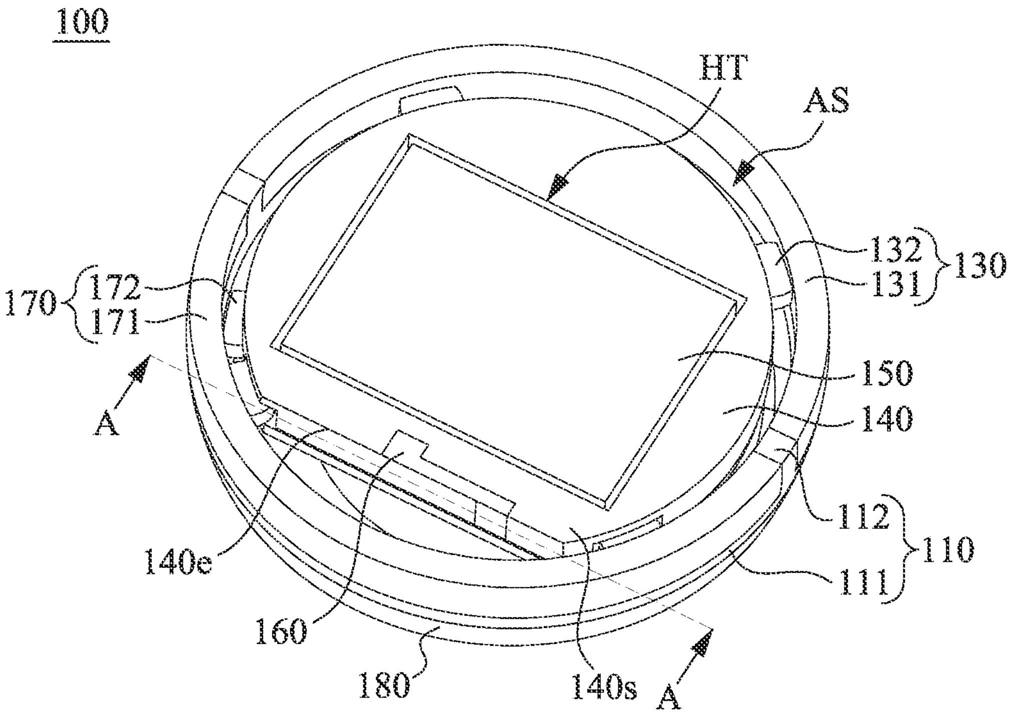
FIG. 4 is a schematic three-dimensional view of the integrated antenna structure of FIG. 1, where a display screen is omitted.
Figure 5:
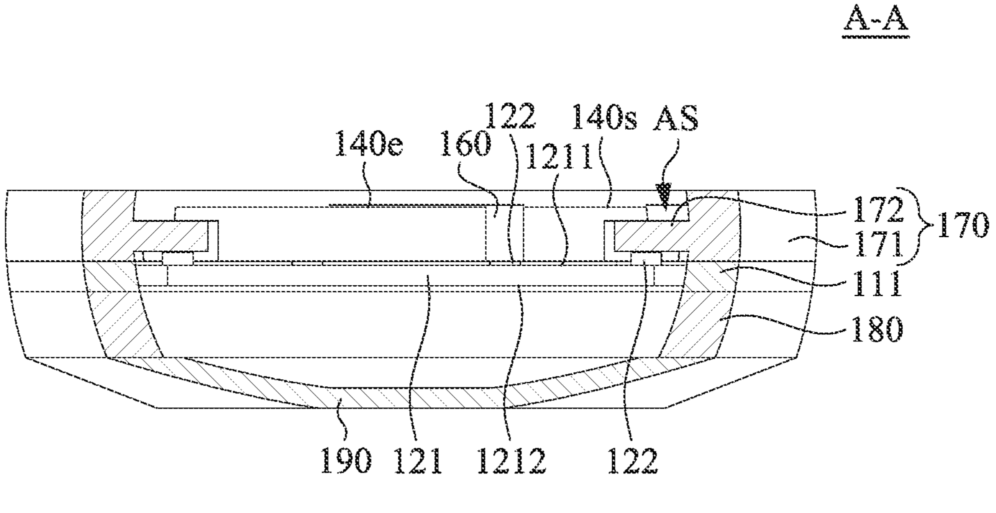
FIG. 5 is a cross-sectional view taken along line A-A in FIG. 4.

Refer to FIG. 4 and FIG. 5. FIG. 4 is a schematic three-dimensional view of the integrated antenna structure 100 of FIG. 1, where the display screen 195 is omitted. FIG. 5 is a cross-sectional view taken along line A-A in FIG. 4. In this implementation, as shown in FIG. 4 and FIG. 5, the support plate 140 is disposed in the accommodation space AS, and the battery 150 is disposed on the support plate 140. More specifically, the support plate 140 has a through hole HT, and the battery 150 is at least partially disposed in the through hole HT. Further, the integrated antenna structure 100 includes at least one metal sheet 160, and the metal sheet 160 is at least partially disposed on a surface **140*s* of the support plate 140 and extends along an edge 140*e* of the support plate 140. In practical applications, the metal sheet 160 is disposed on the surface 140*s* of the support plate 140** by using laser direct structuring (LDS).

Specifically, as shown in FIG. 3 and FIG. 5, the circuit board 120 includes a mainboard 121 and a plurality of first elastic pieces 122. The mainboard 121 has a first surface 1211 and a second surface 1212 opposite to each other. The first elastic pieces 122 are disposed on the first surface 1211 of the mainboard 121. In this implementation, one end of the metal sheet 160 is electrically connected to one first elastic piece 122 of the circuit board 120, and this first elastic piece 122 is used as a feeding point. In this case, the metal sheet 160 becomes a set of antennas and performs a signal receiving function.

Figure 6:
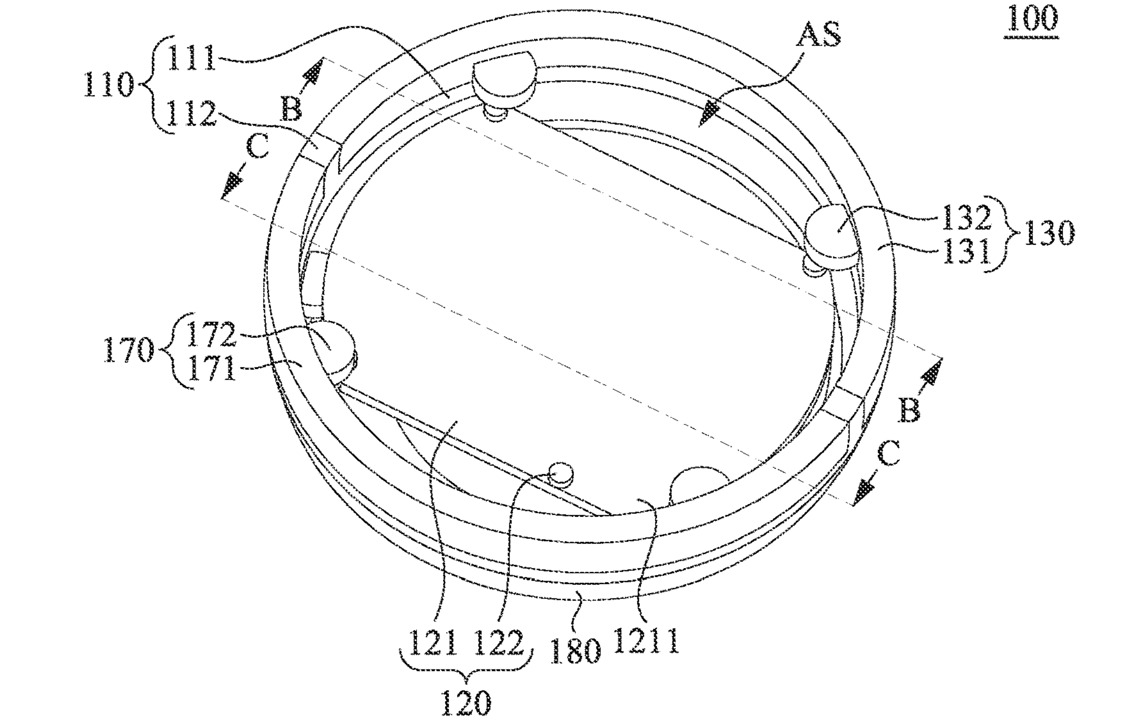
FIG. 6 is a schematic three-dimensional view of the integrated antenna structure of FIG. 1, where a display screen and a support plate are omitted.
Figure 7:
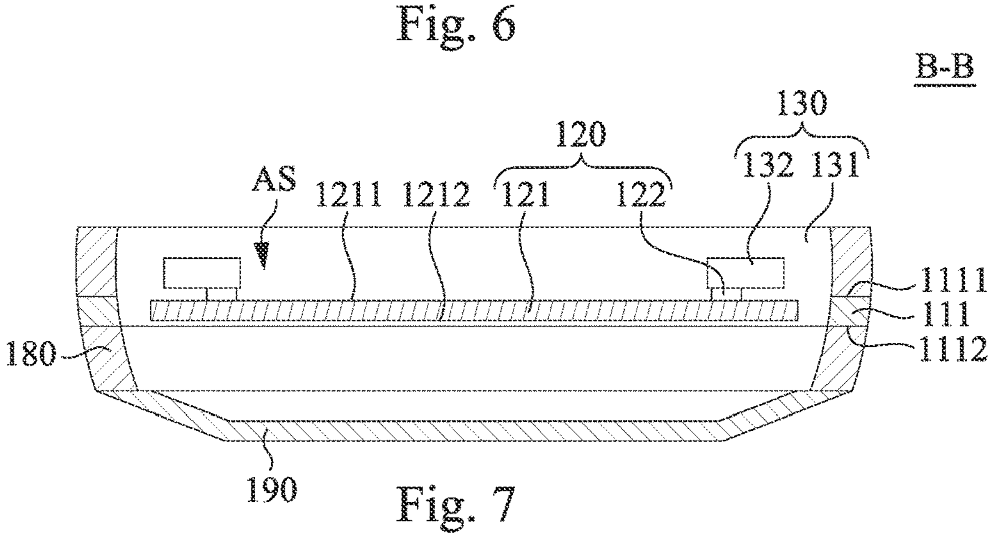
FIG. 7 is a cross-sectional view taken along line B-B in FIG. 6.

Refer to FIG. 6 and FIG. 7. FIG. 6 is a schematic three-dimensional view of the integrated antenna structure 100 of FIG. 1, where the display screen 195 and the support plate 140 are omitted. FIG. 7 is a cross-sectional view taken along line B-B in FIG. 6. In this implementation, as shown in FIG. 6 and FIG. 7, the first platforms 132 of the first antenna radiator 130 are electrically connected to two first elastic pieces 122 of the circuit board 120. One of the first elastic pieces 122 is used as a feeding point, and the other first elastic piece 122 is used as a grounding point. In this case, the first antenna radiator 130 becomes another set of antennas and performs the signal receiving function. In another implementation, the grounding point may be omitted according to actual situations, that is, the first antenna radiator 130 is electrically connected to only one first elastic piece 122.

As described above, in this implementation, the integrated antenna structure 100 includes an antenna (that is, the metal sheet 160) disposed on the support plate 140 by using the LDS, and an antenna (that is, the first antenna radiator 130) connected to the frame 110 by using the NMT, and the support plate 140 is disposed in the accommodation space AS of the frame 110. Therefore, the integrated antenna structure 100 can include two different antennas in a limited volume, so that the integrated antenna structure 100 can achieve miniaturization while enhancing the signal receiving function.

Figure 8:
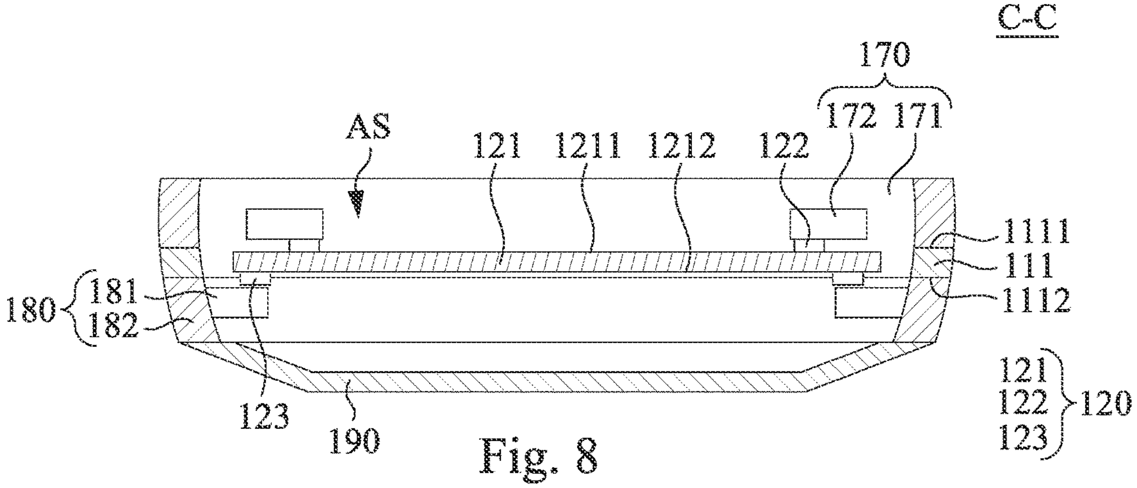
FIG. 8 is a cross-sectional view taken along line C-C in FIG. 6.

Refer to FIG. 1 to FIG. 6, and FIG. 8. FIG. 8 is a cross-sectional view taken along line C-C in FIG. 6. Further, as shown in FIG. 1 to FIG. 6, and FIG. 8, the integrated antenna structure 100 further includes at least one second antenna radiator 170. The second antenna radiator 170 includes a second body 171 and a plurality of second platforms 172. The second body 171 of the second antenna radiator 170 is disposed on the first side 1111 of the annular portion 111 and is connected between two adjacent separation portions 112. The second body 171 at least partially surrounds the accommodation space AS and is opposite to the first body 131 of the first antenna radiator 130. The second platforms 172 of the second antenna radiator 170 are connected to the second body 171 and protrude toward the accommodation space AS. The display screen 195 abuts against the separation portions 112, and sides of the first antenna radiator 130 and the second antenna radiator 170 respectively away from the annular portion 111, to seal the accommodation space AS.

Similarly, a material of the second antenna radiator 170 is also metal, and the second antenna radiator 170 is also integrated to the frame 110 by using the NMT. That is, the second body 171 of the second antenna radiator 170 is connected between the separation portions 112 and is disposed on the first side 1111 of the annular portion 111.

In this implementation, as shown in FIG. 8, the second platforms 172 of the second antenna radiator 170 are electrically connected to another two first elastic pieces 122 of the circuit board 120. One of the first elastic pieces 122 is used as a feeding point, and the other first elastic piece 122 is used as a grounding point. In this case, the second antenna radiator 170 also becomes another set of antennas and performs the signal receiving function. In another implementation, the grounding point may be omitted according to actual situations, that is, the second antenna radiator 170 is electrically connected to only one first elastic piece 122.

In practical applications, for example, as shown in FIG. 3, FIG. 4, and FIG. 6, a center of the annular portion 111 and the separation portions 112 are arranged in line. In other words, shapes of the first body 131 of the first antenna radiator 130 and the second body 171 of the second antenna radiator 170 may be mirror-symmetrical, but the present disclosure is not limited thereto.

Figure 9:
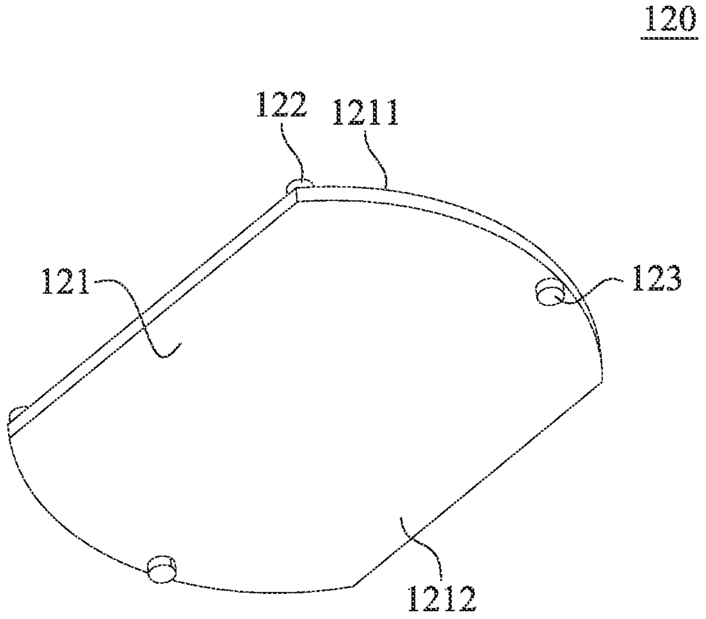
FIG. 9 is a schematic three-dimensional bottom view of a circuit board of FIG. 3.

Refer to FIG. 8 and FIG. 9. FIG. 9 is a schematic three-dimensional bottom view of the circuit board 120 of FIG. 3. In this implementation, as shown in FIG. 8 and FIG. 9, the circuit board 120 includes a plurality of second elastic pieces 123. The second elastic pieces 123 are disposed on the second surface 1212 of the mainboard 121. As shown in FIG. 1 to FIG. 8, the integrated antenna structure 100 further includes at least one third antenna radiator 180. The third antenna radiator 180 includes a third body 181 and a plurality of third platforms 182. The third body 181 of the third antenna radiator 180 is disposed on the second side 1112 of the annular portion 111 and surrounds the accommodation space AS. The third platforms 182 of the third antenna radiator 180 are connected to the third body 181 and protrude toward the accommodation space AS. In practical applications, for example, the third body 181 of the third antenna radiator 180 is ring-shaped.

Similarly, a material of the third antenna radiator 180 is also metal, and the third antenna radiator 180 is also integrated to the frame 110 by using the NMT. That is, the third body 181 of the third antenna radiator 180 is disposed on the second side 1112 of the annular portion 111.

In this implementation, as shown in FIG. 8, the third platforms 182 of the third antenna radiator 180 are electrically connected to two second elastic pieces 123 of the circuit board 120. One of the second elastic pieces 123 is used as a feeding point, and the other second elastic piece 123 is used as a grounding point. In this case, the third antenna radiator 180 also becomes another set of antennas and performs the signal receiving function. In another implementation, the grounding point may be omitted according to actual situations, that is, the third antenna radiator 180 is electrically connected to only one second elastic piece 123.

As described above, in this implementation, the integrated antenna structure 100 includes an antenna (that is, the metal sheet 160) disposed on the support plate 140 by using the LDS, and a plurality of antennas (that is, the first antenna radiator 130, the second antenna radiator 170, and the third antenna radiator 180) connected to the frame 110 by using the NMT, and the support plate 140 is disposed in the accommodation space AS of the frame 110. Therefore, the integrated antenna structure 100 can include a plurality of different antennas in a limited volume, so that the integrated antenna structure 100 can achieve miniaturization while enhancing the signal receiving function.

In addition, as shown in FIG. 2, FIG. 3, FIG. 5, FIG. 7, and FIG. 8, the integrated antenna structure 100 further includes a housing 190. The housing 190 abuts against one side of the third body 181 of the third antenna radiator 180 away from the frame 110, to seal the accommodation space AS. In practical applications, the housing 190 may be made of a non-metal material. Therefore, when the integrated antenna structure 100 is applied to a wearable electronic product, the housing 190 may be used to abut against a human body, and prevent the first antenna radiator 130, the second antenna radiator 170, and the third antenna radiator 180 from entering into direct contact with the human body to affect the signal receiving efficiency of the integrated antenna structure 100.

Figure 10:
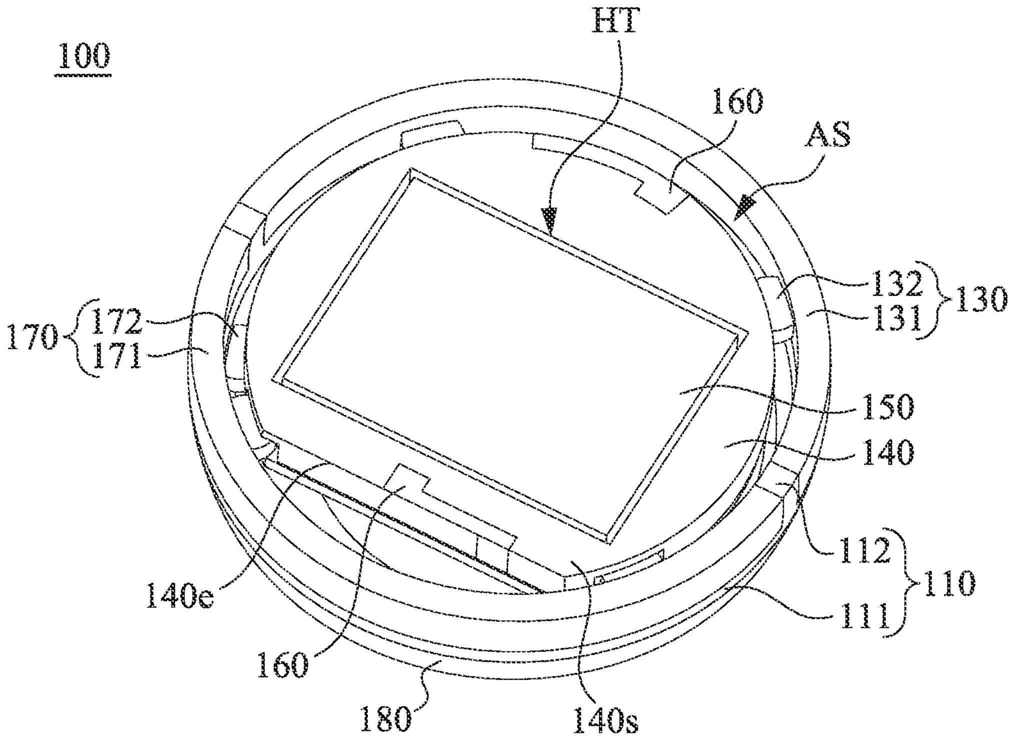
FIG. 10 is a schematic three-dimensional view of an integrated antenna structure according to another implementation of the present disclosure, where a display screen is omitted.

Refer to FIG. 10. FIG. 10 is a schematic three-dimensional view of an integrated antenna structure 100 according to another implementation of the present disclosure, where the display screen 195 is omitted. In this implementation, according to actual situations, there may be a plurality of metal sheets 160. For example, as shown in FIG. 10, there are two metal sheets 160, which are respectively disposed on opposite sides of the support plate 140. In this way, the quantity of antennas in the integrated antenna structure 100 can be further increased.

Based on the above, the technical solutions disclosed in the foregoing implementations of the present disclosure have at least the following advantages: The integrated antenna structure includes an antenna disposed on the support plate by using the LDS and a plurality of antennas connected to the frame by using the NMT, and the support plate is disposed in the accommodation space of the frame. Therefore, the integrated antenna structure can include a plurality of different antennas in a limited volume, so that the integrated antenna structure can achieve miniaturization while enhancing the signal receiving function.

What is claimed is:

1. An integrated antenna structure, comprising:

a frame, surrounding and defining an accommodation space, the frame comprising an annular portion and a plurality of separation portions, the annular portion having a first side and a second side opposite to each other, the separation portions being disposed on the first side;

a circuit board, disposed in the accommodation space;

at least one first antenna radiator, comprising a first body and a plurality of first platforms, wherein the first body is disposed on the first side by using a nano molding technology (NMT) and is connected between two adjacent separation portions, the first body at least partially surrounds the accommodation space, the first platforms are connected to the first body and protrude toward the accommodation space, and the first platforms are configured to be electrically connected to the circuit board respectively;

a support plate, disposed in the accommodation space;

a battery, disposed on the support plate; and at least one metal sheet, at least partially disposed on a surface of the support plate and extending along an edge of the support plate, wherein one end of the metal sheet is electrically connected to the circuit board.

2. The integrated antenna structure according to claim 1, wherein the metal sheet is disposed on the surface of the support plate by using laser direct structuring (LDS).

3. The integrated antenna structure according to claim 1, further comprising:

at least one second antenna radiator, comprising a second body and a plurality of second platforms, wherein the second body is disposed on the first side by using the NMT and is connected between two adjacent separation portions, the second body at least partially surrounds the accommodation space and is opposite to the first body, the second platforms are connected to the second body and protrude toward the accommodation space, and the second platforms are configured to be electrically connected to the circuit board respectively.

4. The integrated antenna structure according to claim 3, wherein the circuit board comprises a mainboard and a plurality of first elastic pieces, the mainboard has a first surface and a second surface opposite to each other, the first elastic pieces are disposed on the first surface, and the first platforms, the second platforms, and the metal sheet are electrically connected to the corresponding first elastic pieces respectively.

5. The integrated antenna structure according to claim 4, wherein the circuit board comprises a plurality of second elastic pieces, the second elastic pieces are disposed on the second surface, and the integrated antenna structure further comprises:

at least one third antenna radiator, comprising a third body and a plurality of third platforms, wherein the third body is disposed on the second side by using the NMT and surrounds the accommodation space, the third platforms are connected to the third body and protrude toward the accommodation space, and the third platforms are configured to be electrically connected to the corresponding second elastic pieces respectively.

6. The integrated antenna structure according to claim 5, wherein the third body is ring-shaped.

7. The integrated antenna structure according to claim 5, further comprising:

a housing, abutting against one side of the third body away from the frame, to seal the accommodation space.

8. The integrated antenna structure according to claim 3, further comprising:

a display screen, abutting against the separation portions, and sides of the first antenna radiator and the second antenna radiator respectively away from the annular portion, to seal the accommodation space.

9. The integrated antenna structure according to claim 1, wherein a center of the annular portion and the separation portions are arranged in line.

10. The integrated antenna structure according to claim 1, wherein the integrated antenna structure has a plurality of the metal sheets.

11. The integrated antenna structure according to claim 1, wherein the support plate has a through hole, and the battery is at least partially disposed in the through hole.

* * * * *